(12) United States Patent
Schell et al.

(10) Patent No.: US 10,139,274 B2
(45) Date of Patent: Nov. 27, 2018

(54) METHOD OF OPTICAL POWER SELF-REFERENCING AND TEST CORD VERIFICATION

(71) Applicant: Fluke Corporation, Everett, WA (US)

(72) Inventors: J. David Schell, Austin, TX (US); Seymour Goldstein, Austin, TX (US)

(73) Assignee: Fluke Corporation, Everett, WA (US)

( * ) Notice: Subject to any disclaimer, the term of this patent is extended or adjusted under 35 U.S.C. 154(b) by 52 days.

(21) Appl. No.: 15/471,846

(22) Filed: Mar. 28, 2017

(65) Prior Publication Data

US 2018/0283937 A1    Oct. 4, 2018

(51) Int. Cl.
*G01J 1/44*    (2006.01)

(52) U.S. Cl.
CPC ...................... *G01J 1/44* (2013.01)

(58) Field of Classification Search
CPC ... G02B 6/4225; G02B 6/3586; G01J 3/0218; G01J 3/10; G01J 3/42; G01R 35/005; G01R 27/28; G01R 27/04; H04B 17/14; H04B 17/318
USPC .................................................... 250/227.14
See application file for complete search history.

(56) References Cited

U.S. PATENT DOCUMENTS

| | | |
|---|---|---|
| 4,234,253 A | 11/1980 | Higginbotham et al. |
| 4,673,291 A | 6/1987 | Heckmann |
| 4,726,676 A | 2/1988 | Maslaney et al. |
| 5,305,078 A | 4/1994 | Lamonde |
| 5,455,672 A | 10/1995 | Lamonde et al. |
| 5,592,284 A | 1/1997 | Bédard |
| 5,748,302 A | 5/1998 | Unno |
| 5,825,516 A | 10/1998 | Walsh |
| 9,203,730 B1 * | 12/2015 | Johnson .................. H04L 43/08 |
| 2016/0164601 A1 | 6/2016 | Perron |

* cited by examiner

*Primary Examiner* — Que T Le
(74) *Attorney, Agent, or Firm* — Seed Intellectual Property Law Group LLP

(57) ABSTRACT

An optical measurement device and loss measurement is provided. The optical measurement device receives one or more optical signals that respectively emanate from one or more optical fibers of a plurality of optical fibers of an optical fiber cable. The optical measurement device captures one or more images of the one or more optical signals and determines, based on the one or more images, one or more receiving positions of the one or more optical signals, respectively.

22 Claims, 5 Drawing Sheets

METHOD OF OPTICAL POWER SELF-REFERENCING AND TEST CORD VERIFICATION

BACKGROUND

Technical Field

This application is directed to an optical power self-referencing method for determining optical signal loss and/or test cord verification and, in particular, to an optical power self-referencing method with a low uncertainty measurement.

Description of the Related Art

Conventional devices that measure optical signal intensity utilize an optical detector that is typically coupled individually to each optical fiber of the optical array. A conventional device may be used to measure the optical intensity of an optical signal transmitted through each optical fiber of the array. However, the need to couple the device to each optical fiber individually in order to obtain an intensity measurement is time consuming.

In order to perform a loss measurement, a first optical power measurement is made and recorded as a reference to which subsequent measurements are compared. For field testing optical fiber links, a handheld power meter and optical source are typically utilized. Devices that perform this function are varied and well known, such as those described in U.S. Pat. No. 4,234,253, U.S. Pat. No. 4,673,291, U.S. Pat. No. 4,726,676, U.S. Pat. No. 5,825,516, and U.S. Pat. No. 5,748,302.

Figure 1:
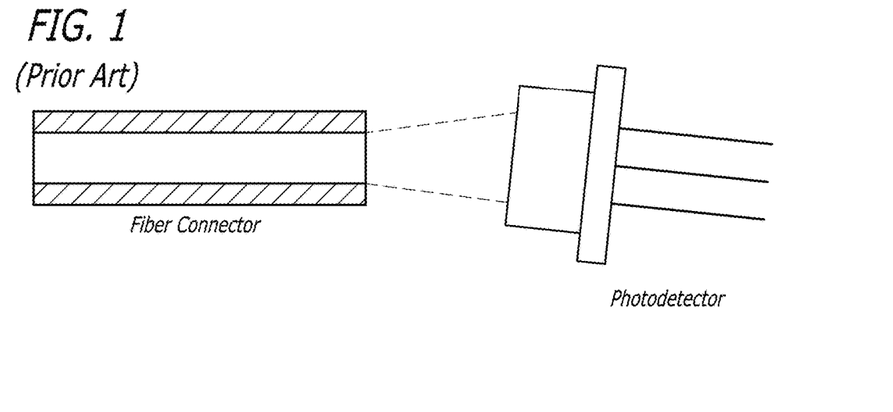
FIG. 1 shows an embodiment of a non-contact power meter input with a fiber connector and a photodetector.

FIG. 1 shows an embodiment of a non-contact power meter input with a fiber connector and a photodetector. As shown in FIG. 1, the conventional power meter typically has a large area detector whose input does not make contact with the connector that is connected to the test port. Since the detector is non-contact and covers a large area, the measurement uncertainty is very low with respect to the power of the optical signal exiting the test cord. Accordingly, a test cord may be inserted, removed, and reinserted with very low uncertainty.

Figure 2:
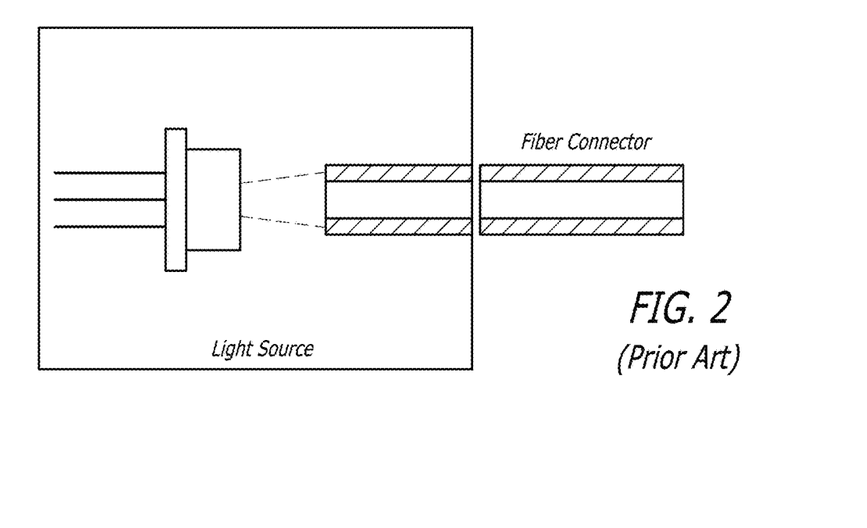
FIG. 2 is an embodiment of a light source with a fiber connector.

FIG. 2 is an embodiment of a light source with a fiber connector. As shown in FIG. 2, the optical source usually has a fiber pigtail connected to an internal light source whose end is terminated with a connector that makes physical contact with the test cord's connector. Since the connector is in physical contact, the amount of light that transmits into the test cord will vary depending upon the connection quality and amount of contamination. For this reason, it is common practice to leave the test cord connected to the light source for the duration of all field measurements. By not disconnecting and reconnecting the test cord from the light source, the uncertainty is minimized.

Figure 3:
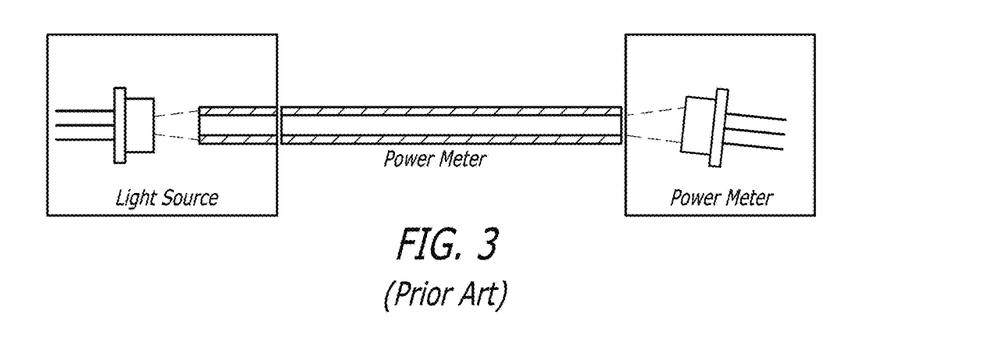
FIG. 3 shows an embodiment of a 1-jumper method with a light source, a single jumper, and a power meter.

FIG. 3 shows an embodiment of a 1-jumper method with a light source, a single jumper, and a power meter. As shown in FIG. 3, the first power measurement, which is used as a reference for all subsequent measurements, is best obtained by attaching a first test cord directly to the light source and the power meter. This configuration is specifically known as the 1-jumper reference method and is defined in measurement standards. The measurement of loss, or attenuation, of the link using the 1-jumper reference method is accomplished by disconnecting the first test cord from the power meter while leaving the first test cord attached to the light source. In this manner, any variation due to the light source's physical contact connection is minimized.

Continuing with the 1-jumper reference method, a second test cord is connected to the power meter. Preferably, the two test cords are now connected together to measure the loss of their connection in order to verify their quality. Next, the power meter is connected to the link under test via the second test cord and the light source is connected to the opposite end of the fiber link under test via the first test cord. Notably, the test cord's connectors should be the same type of connector as the fiber link under test. Accordingly, the power meter's connector should also be the same type of connector since it also must be connected to the first test cord during the referencing process.

Notably, there are 2-jumper reference methods and 3-jumper reference methods as well. However, the 1-jumper reference method provides the lowest uncertainty to the loss measurement. The other methods add uncertainty, but are sometimes utilized to overcome deficiencies in the test equipment, such as connector ports that are different than the fiber link under test.

Some conventional devices are equipped with multiple sensors, whereby each sensor captures an optical signal received from a respective optical fiber of the array. For these devices to work properly, the sensors must be respectively aligned with the optical fibers. Due to the fact that optical array connectors, such as multi-fiber push-on (MPO) connectors, are gender-specific (i.e., pinned or unpinned), a gender-compliant device is required in order to attach the device to the connector and ensure alignment. Thus, personnel performing field tests on optical arrays may need to carry multiple devices for both genders.

Figure 4:
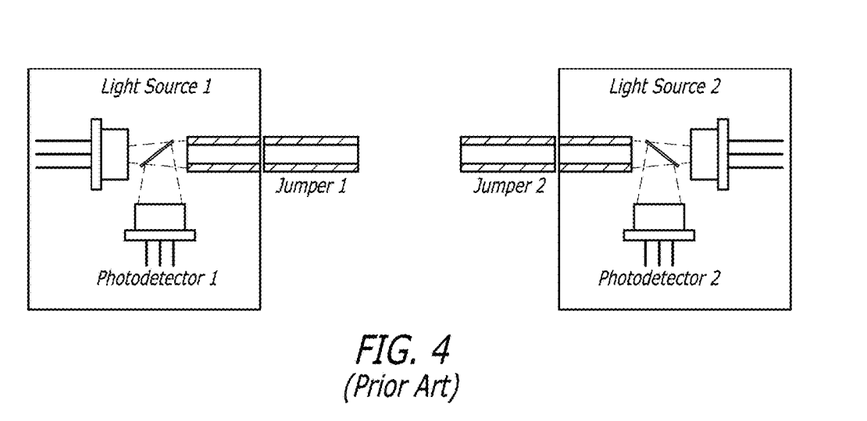
FIG. 4 shows an embodiment of first and second bi-directional optical loss testers with first and second test cords.

For example, a common alternative to the 1-jumper reference method, which uses a source at one end and a photodetector at the other end, is to integrate both a source and photodetector at both ends. This configuration enables the link under test to be tested in both directions (bi-directional) without having to swap ends. As shown in FIG. 4, the light source and photodetector integration may be accomplished with the use of a free-space optical system that aligns the devices to a fiber pigtail. In this regard, FIG. 4 shows an embodiment of first and second bi-directional optical loss testers with first and second test cords.

Figure 5:
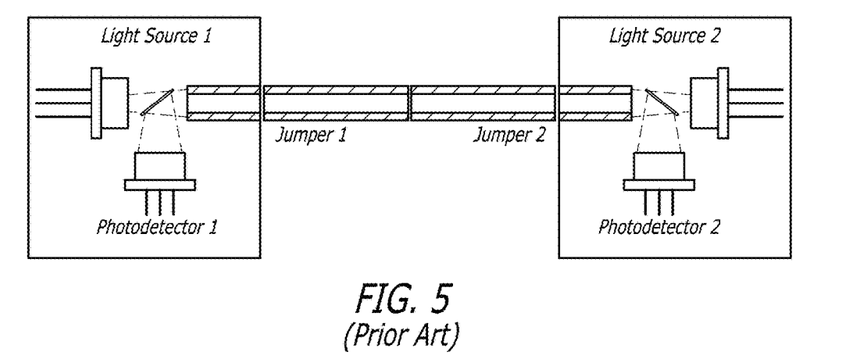
FIG. 5 shows an embodiment of first and second bi-directional optical loss testers with first and second test cords that have a mutually shared middle connection.

In another reference method, a pigtailed light source and photodetector are attached to an optical coupler/splitter. In both directions, the light source and photodetector are typically connected to the test port via a fiber pigtail and connector. As described above, this physical contact connector has a high variability if the optical fiber is disconnected and reconnected. Accordingly, the reference is best obtained by attaching a first test cord to the first optical loss tester and a second test cord to the second optical loss tester. For example, FIG. 5 shows an embodiment of first and second bi-directional optical loss testers with first and second test cords, respectively, that have a mutually shared middle connection. As shown in FIG. 5, these two test cords are then connected and a reference measurement is obtained, in both directions, through the two test cords and their mutually shared connection.

A significant contribution to measurement uncertainty associated with the 2-jumper referencing method is with respect to the quality of the mutually shared middle connections (i.e., the reference connection). If this "reference connection" contributes high loss, due to connector quality or contamination, then the reference measurement will be low, resulting in incorrect low loss readings. These bi-directional optical loss test sets are well known, such as those described in U.S. Pat. No. 5,455,672, U.S. Pat. No. 5,592,284, U.S. Pat. No. 5,305,078, and U.S. Pat. No. 5,455,672.

Notably, the amount of loss in a fiber link is quite large relative to the uncertainty associated with this method, particularly with fiber links that are long. Accordingly, in the case of fiber links that are long, the uncertainty due to referencing becomes less important. However, for short links (typically 100 m or less), such as those found in data centers, the uncertainty is large relative to the fiber link loss, rendering 2-jumper referencing methods and 3-jumper referencing methods undesirable.

Thus, in order to improve absolute power measurement uncertainty (not relative loss measurements), suppliers sometimes include a second test port on each tester that contains a non-contact photodetector. This second test port on each tester is utilized for power measurements but may also be used for loss measurements if the bi-directional feature is disabled.

This second test port of an optical loss tester may also be used to set a reference measurement. In one such method to set the reference measurement, the output of the first test port is connected directly to the second test port on the same optical loss tester. This is repeated on the second optical loss tester. Thus, each optical loss tester measures its own output power. Subsequently, when testing the fiber link, each optical loss tester may communicate with the other optical loss tester to inform the other optical loss tester of its output power.

The uncertainty associated with this method is also high relative to the 1-jumper method because the reference measurement is made utilizing a power meter that is not the same power meter as the one used to measure the loss. Therefore, in addition to the normal uncertainty of a 1-jumper reference, there is the additional uncertainty of the absolute power measurement differences between the two power meters. This method is described in, for example, U.S. Pat. No. 5,455,672.

In still another referencing option, the first test port of the first optical loss tester is connected to the second test port of the second optical loss tester. Conversely, the second test port of the first optical loss tester is connected to the first test port of the second optical loss tester. However, a significant drawback of this method is that the power measurements are made by a power meter that is not the same power meter as the one that was used to measure the link loss. As such, additional uncertainty again results. Accordingly, there is a continuing need in the art to minimize uncertainty in these measurements. It is with respect to these and other considerations that the embodiments described herein have been made.

Notably, all of the subject matter discussed in this section is not necessarily prior art and should not be assumed to be prior art merely as a result of its discussion in this section. Accordingly, any recognition of problems in the prior art discussed in this section or associated with such subject matter should not be treated as prior art unless expressly stated to be prior art. Instead, the discussion of any subject matter in this section should be treated as part of the identification of the technological problem to be overcome, which in and of itself may also be inventive.

BRIEF SUMMARY

In at least one embodiment, an optical power self-referencing method determines optical signal loss and/or test cord verification with a low uncertainty measurement. The method includes: providing a first optical measurement device having a first photodetector$_{BiDi}$ and a first light source$_{BiDi}$ in a first bi-directional port and a first photodetector$_{PM}$ in a first power meter port; providing a second optical measurement device having a second photodetector$_{BiDi}$ and a second light source$_{BiDi}$ in a second bi-directional port and a second photodetector$_{PM}$ in a second power meter port; receiving factory calibration correction factors, $\rho1$ and $\rho2$, wherein $\rho1$ is a factory measurement error between the first photodetector$_{PM}$ and the first photodetector$_{BiDi}$ of the first optical measurement device, and wherein $\rho2$ is a factory measurement error between the second photodetector$_{PM}$ and the second photodetector$_{BiDi}$ of the second optical measurement device; connecting, on the first optical measurement device, the first bi-directional port to the first power meter port using a first test cord and measuring a power level of an optical signal received at the first power meter, Px1; connecting, on the second optical measurement device, a second bi-directional port to the second power meter port using a second test cord and measuring a power level of an optical signal received at a second power meter, Py1.

The method further includes: disconnecting, on the first optical measurement device, the first test cord from the first power meter port and connecting the first bi-directional port to the second power meter port using the first test cord and measuring the power level of an optical signal received at the second power meter, Px2; disconnecting, on the second optical measurement device, the second test cord from the second power meter port and connecting the second bi-directional port to the first power meter port using the second test cord and measuring the power level of an optical signal received at the first power meter, Py2; determining field calibration correction factors, $\rho3$ and $\rho4$, wherein $\rho3$ is a field measurement error between the first photodetector$_{PM}$ and the first photodetector$_{BiDi}$ of the first optical measurement device, wherein $\rho4$ is a field measurement error between the second photodetector$_{PM}$ and the second photodetector$_{BiDi}$ of the second optical measurement device; and wherein: Px2=Px1–$\rho3$, Py2=Py1–$\rho4$, P$_{ref1}$=Py2–$\rho3$, and P$_{ref2}$=Px2–$\rho4$. Notably, these equations are performed using a logarithmic scale so that equations include subtraction functions.

The method further includes calculating P$_{ref1}$ and P$_{ref2}$ by substituting Px2 and Py2, wherein P$_{ref1}$=Py1–$\rho4$–$\rho1$, and P$_{ref2}$=Px1–$\rho3$–$\rho2$; performing jumper verification by disconnecting the first test cord from the second power meter port to leave a connection end of the first test cord, disconnecting the second test cord from the first power meter port to leave a connection end of the second test cord, connecting the connection end of the first test cord to the connection end of the second test cord, and measuring power levels of optical signals received by the first test cord, Py3, and by the second test cord, Py3; and performing loss testing by disconnecting the connection end of the first test cord from the connection end of the second test cord, connecting the connection end of the first test cord and the connection end of the second test cord to opposite ends of an optical fiber link being tested, and measuring power levels of optical signals received by the first test cord, Py4, and by the second test cord, Py4, through the optical fiber link being tested; wherein a loss at the first bi-directional port equals: Py4–P$_{ref1}$, and wherein loss at the second bi-directional port equals: Px4–P$_{ref2}$.

In another aspect of at least one embodiment, the first optical measurement device includes a first processor and a first memory, while the second optical measurement device includes a second processor and a second memory. Additionally, the first bi-directional port of the optical measurement device contains first photodetector$_{BiDi}$ and first light source$_{BiDi}$, and the first power meter port optical measurement device contains a non-contact first photodetector$_{PM}$. Furthermore, the second bi-directional port of the second optical measurement device contains combined second photodetector$_{BiDi}$ and second light source$_{BiDi}$, while the second power meter port of the second optical measurement device contains a non-contact second photodetector$_{PM}$.

Notably, after receiving field calibration correction factors, ρ3 and ρ4, from a previous fiber link measurement using the first and second optical measurement devices, future optical power self-reference measurements use the previously determined ρ3 and ρ4, and do not include connecting a jumper from a bi-directional port of one optical measurement device to a power meter port of another optical measurement device. The method enables a single fiber bi-directional optical loss tester to perform a self-reference measurement that has an uncertainty level approximate to the uncertainty level of a 1-jumper reference measurement method.

In another embodiment of an optical power self-referencing method, the method includes: providing a first optical measurement device having a first photodetector$_{BiDi}$ and a first light source$_{BiDi}$ in a first bi-directional port and a first photodetector$_{PM}$ in a first power meter port; providing a second optical measurement device having a second photodetector$_{BiDi}$ and a second light source$_{BiDi}$ in a second bi-directional port and a second photodetector$_{PM}$ in a second power meter port; receiving factory calibration correction factors, ρ1 and ρ2, wherein ρ1 is a factory measurement error between the first photodetector$_{PM}$ and the first photodetector$_{BiDi}$ of the first optical measurement device, and wherein ρ2 is a factory measurement error between the second photodetector$_{PM}$ and the second photodetector$_{BiDi}$ of the second optical measurement device; receiving field calibration correction factors, ρ3 and ρ4, wherein ρ3 is a field measurement error between the first photodetector$_{PM}$ and the first photodetector$_{BiDi}$ of the first optical measurement device, wherein ρ4 is a field measurement error between the second photodetector$_{PM}$ and the second photodetector$_{BiDi}$ of the second optical measurement device; and wherein: $P_{ref1}$=Py2−ρ3, and $P_{ref2}$=Px2−ρ4.

Additionally, the optical power self-referencing method includes: calculating $P_{ref1}$ and $P_{ref2}$ by substituting Px2 and Py2, wherein $P_{ref1}$=Py1−ρ4−ρ1, and $P_{ref2}$=Px1−ρ3−ρ2; and performing loss testing by disconnecting the connection end of the first test cord from the connection end of the second test cord, connecting the connection end of the first test cord and the connection end of the second test cord to opposite ends of a fiber link being tested, and measuring power levels received at first test cord, Py4, and at the second test cord, Py4; wherein a loss at the first bi-directional port equals: Py4−Pref1, and wherein loss at the second bi-directional port equals: Px4−Pref2.

These features, with other technological improvements that will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a method of optical power self-referencing and test cord verification. Representative examples utilizing many of these additional features and teachings, both separately and in combination, are described in further detail with reference to attached FIGS. 6-11. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method. Also other methods and systems may also be used.

Figure 6:
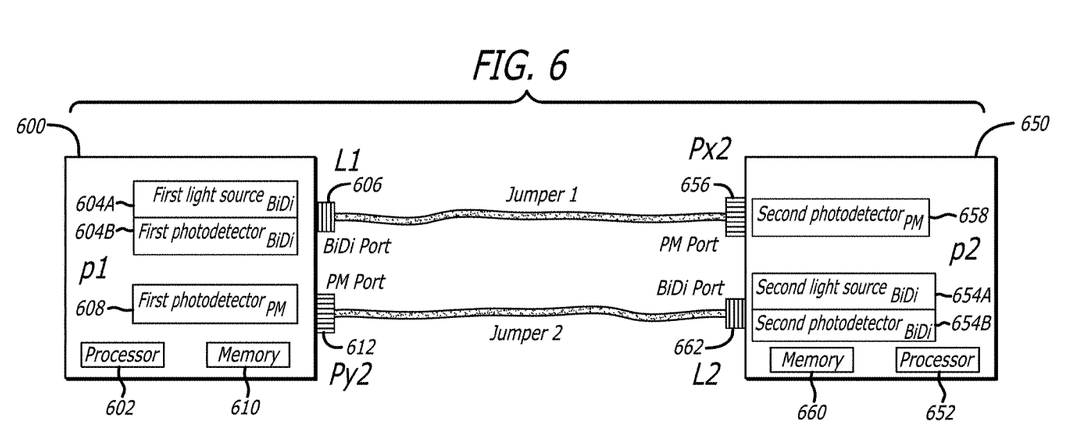
FIG. 6 shows an embodiment of first and second bi-directional optical loss testers, wherein each bi-directional optical loss tester includes a second test port that contains a non-contact photodetector, the bi-directional optical loss testers being arranged to perform a measurement of power by the opposite tester.

Referring now to FIG. 6, an embodiment of first and second bi-directional optical loss testers are shown in which each bi-directional optical loss tester includes a second test port that contains a non-contact photodetector, and the bi-directional optical loss testers are arranged to perform a measurement of power by the opposite tester. Specifically, FIG. 6 shows a block diagram of a first bi-directional optical loss tester 600 and a second bi-directional optical loss tester 650 in accordance with at least one embodiment. The first bi-directional optical loss tester 600 includes a processor 602, a first light source$_{BiDi}$ 604A, a first photodetector$_{BiDi}$ 604B, a bi-directional (BiDi) port 606, a first photodetector$_{PM}$ 608, a memory 610, and a power meter (PM) port 612. The first light source$_{BiDi}$ 604A, first photodetector$_{BiDi}$ 604B, BiDi port 606, first photodetector$_{PM}$ 608, memory 610, and PM port 612 are communicatively coupled to the processor 602. The second bi-directional optical loss tester 650 includes a processor 652, a second light source$_{BiDi}$ 654A, a second photodetector$_{BiDi}$ 654B, a bi-directional (BiDi) port 656, a second photodetector$_{PM}$ 658, a memory 660, and a power meter (PM) port 662. The second light source$_{BiDi}$ 654A, second photodetector$_{BiDi}$ 654B, BiDi port 656, second photodetector$_{PM}$ 658, memory 660, and PM port 662 are communicatively coupled to the processor 652.

In at least one embodiment of the optical power self-referencing method, the method implements a "self-reference" measurement that has nearly the same uncertainty as a 1-jumper reference measurement with a single fiber bi-directional optical loss tester, without the disadvantage of the 1-jumper reference method.

The optical power self-referencing method makes use of an initial factory calibration that is performed at the time of manufacture and at subsequent service intervals. This factory calibration determines a correction factor between the power measurements that are made by the first and second ports on each bi-directional optical loss testers. Knowing this correction factor enables the bi-directional optical loss testers to automatically correct the reference and loss measurements when made by one of the test ports.

Referring again to FIG. 6, the first photodetector$_{PM}$ 608 and the second photodetector$_{PM}$ 658 are used for referencing, while the first photodetector$_{BiDi}$ 604B and the second photodetector$_{BiDi}$ 654B are used for fiber link testing. The factory calibration determines the measurement error between first photodetector$_{PM}$ 608 and the first photodetector$_{BiDi}$ 604B, as well as between second photodetector$_{PM}$ 658 and second photodetector$_{BiDi}$ 654B. The factory calibration of the measurement error is defined as ρ1 and ρ2, respectively, where:

$$\rho1 = PA - PX$$

$$\rho2 = PB - PY$$

Using these factory generated correction factors, which may be stored in each bi-directional optical loss tester's memory 610/660, the reference for the first bi-directional optical loss tester may be found as:

$$P_{ref1} = Py2 - \rho1$$

The reference for the second bi-directional optical loss tester may be found as:

$$P_{ref2} = Px2 - \rho2$$

In the field, the first time a particular pair of bi-directional optical loss testers is utilized together, the technician performs a field calibration procedure that enables the bi-directional optical loss testers to determine the field correction factors, defined as ρ3 and ρ4. Notably, these field correction factors, ρ3 and ρ4, are not the same as the previously described factory correction factors, ρ1 and ρ2. The bi-directional optical loss testers each have a first test port that is bi-directional and a second test port that has a non-contact photodetector, or power meter.

Figure 7:
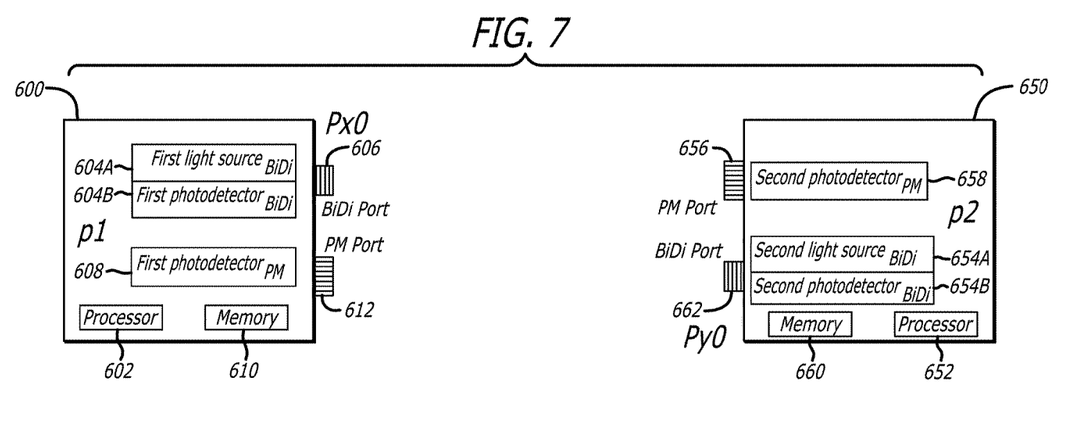
FIG. 7 shows an embodiment of first and second bi-directional optical loss testers of FIG. 6, the bi-directional optical loss testers being arranged to perform measurements of initial output power.

FIG. 7 shows the embodiment of first and second bi-directional optical loss testers in which each bi-directional optical loss tester includes a second test port that contains a non-contact photodetector. The bi-directional optical loss testers are arranged to perform measurements of initial output power. As shown in FIG. 7, the output power of the first BiDi port 606 of bi-directional optical loss tester 600 is defined as Px0. This is the power of the optical signal in the BiDi port's optical fiber before exiting the test port 606. As also shown in FIG. 7, the output power of the second BiDi port 656 of bi-directional optical loss tester 650 is defined as Py0. This is the power of the optical signal in the BiDi port's optical fiber before exiting the test port 656.

Figure 8:
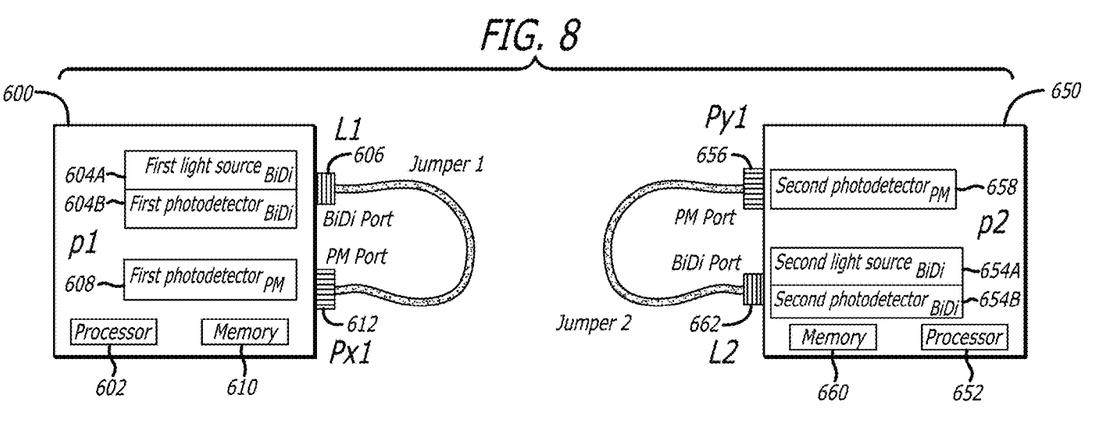
FIG. 8 shows an embodiment of first and second bi-directional optical loss testers of FIG. 6, the bi-directional optical loss testers being arranged to perform measurements of bi-directional test port output power.

Referring now to FIG. 8, this embodiment also shows first and second bi-directional optical loss testers in which each bi-directional optical loss tester includes a second test port that contains a non-contact photodetector. Specifically, the bi-directional optical loss testers of FIG. 8 are arranged to perform measurements of BiDi test port output power.

As shown in FIG. 8, with the first bi-directional optical loss tester 600, the first test cord (i.e., Jumper 1) is attached to connect to the BiDi port 606 and to the PM port 612. The loss at the BiDi port 606 connection reduces the initial power from Px0 to Px1. Correspondingly, in the second bi-directional optical loss tester 600, the second test cord (i.e., Jumper 2) is attached to connect to the BiDi port 656 and to the PM port 662. The loss at the BiDi port 656 connection reduces the initial power from Py0 to Py1. As shown in FIG. 8, Px1 and Py1 are measured by first photodetector$_{PM}$ 608 and second photodetector$_{PM}$ 658, respectively. Accordingly, Px1 and Py1 may be found as:

$$Px1 = Px0 - L1$$

$$Px2 = Py0 - L2$$

Figure 9:
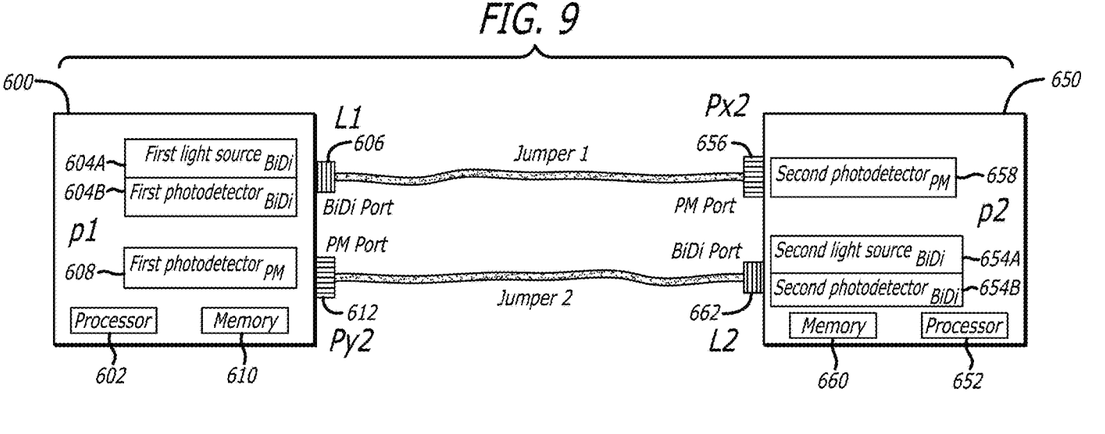
FIG. 9 shows an embodiment of first and second bi-directional optical loss testers of FIG. 6, the bi-directional optical loss testers being arranged to perform a measurement of power by the opposite tester.

As shown in FIG. 9, the two test cords (i.e., Jumper 1 and Jumper 2) are next disconnected from their respective power meter ports and then connected to the power meter port on the opposite bi-directional optical loss tester. The power is again measured, but this time by the opposite bi-directional optical loss tester. These measurements are defined as Px2 and Py2. The actual powers Px1 and Px2 are the same, and under ideal circumstances each meter would report the same power. However, due to uncertainty within the power measurement, the reported measurements of Px1 and Px2 will differ.

At this point the initial reference method is complete. The bi-directional optical loss testers 600 and 650 now communicate the measurements they have made to each other. The bi-directional optical loss testers 600 and 650 then calculate and store correction values:

$$Px1 - Px2 = \rho3$$

$$Py1 - Py2 = \rho4$$

Once ρ3 and ρ4 are known through the field calibration, subsequent reference measurements using the same pair of bi-directional optical loss testers require only the measurement of Px1 and Py1 ("self-referencing") as shown in FIG. 8. As such, since ρ3 and ρ4 may be used in subsequent procedures, it is unnecessary to perform the step shown in FIG. 9, where the two test cords are next disconnected from their respective power meter ports and connected to the power meter port on the opposite bi-directional optical loss tester. The measured power, along with previously obtained correction factors, is communicated to the opposite bi-directional optical loss tester, and then loss testing may commence. Accordingly, the power reference measurements for testing the fiber links may be determined by the following:

Solve for Px2 and Py2:

$$Px2 = Px1 - \rho 3$$

$$Py2 = Py1 - \rho 4$$

As previously stated the references, $P_{ref1}$ and $P_{ref2}$ are:

$$P_{ref1} = Py2 - \rho 1$$

$$P_{ref2} = Px2 - \rho 2$$

Substituting Px2 and Py2 we get:

$$P_{ref1} = Py1 - \rho 4 - \rho 1$$

$$P_{ref2} = Px1 - \rho 3 - \rho 2$$

Figure 10:
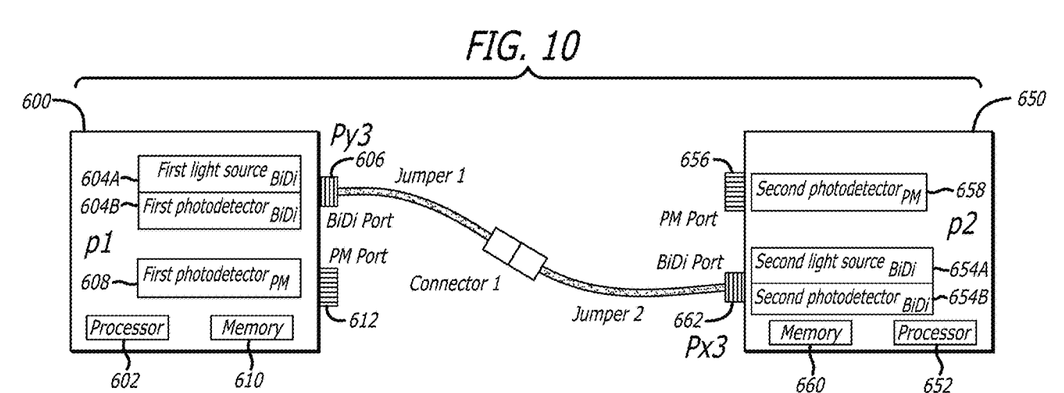
FIG. 10 shows an embodiment of first and second bi-directional optical loss testers of FIG. 6, the bi-directional optical loss testers being arranged to perform a jumper verification of jumper 1 and jumper 2.
Figure 11:
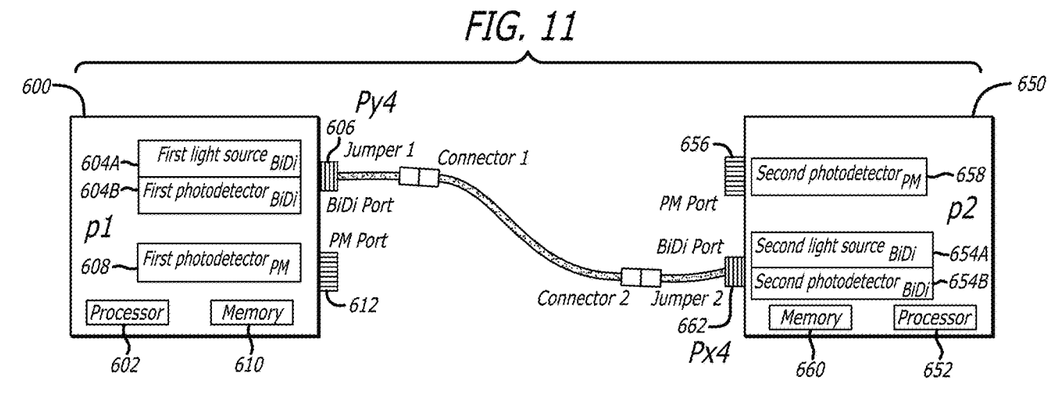
FIG. 11 shows an embodiment of first and second bi-directional optical loss testers of FIG. 6, the bi-directional optical loss testers being arranged to perform loss testing.

Referring now to FIG. 10, the Loss testing of the fiber links under test may now begin. FIG. 10 again shows the embodiment of first and second bi-directional optical loss testers in which each bi-directional optical loss tester includes a second test port that contains a non-contact photodetector. Specifically, in FIG. 10 the bi-directional optical loss testers 600 and 650 are arranged to perform a jumper verification by connecting the two jumpers together to verify the quality of the mutual connection. The power is again measured, and these measurements are defined as Px3 and Py3.

Next, the jumpers are disconnected from their mutual connection and then connected to opposite ends of the fiber link under test. FIG. 11 again shows the embodiment of first and second bi-directional optical loss testers in which each bi-directional optical loss tester includes a second test port that contains a non-contact photodetector. Specifically, in FIG. 11 the bi-directional optical loss testers are arranged to perform a loss testing by connecting to opposite ends of the fiber link under test. The power is again measured, and these measurements are defined as Px4 and Py4.

The loss at the first tester is found by: $Py4 - P_{ref1}$

The loss at the second tester is found by: $Px4 - P_{ref2}$

Notably, this unique process enables low uncertainty measurements without the use of the factory correction factors. Accordingly, the optical power self-referencing method enables a "self-reference" measurement to be performed that has a low uncertainty level that approaches the low uncertainty level of a true 1-jumper reference measurement.

The first and second photodetectors$_{BiDi}$ 604B/654B may be any type of light sensor. For example, the first and second photodetectors$_{BiDi}$ 604B/654B may be photosensors that include one or more photodiodes. The first and second photodetectors$_{BiDi}$ 604B/654B are configured to receive an optical signal, detect an optical intensity of the optical signal, and output data representative of the optical signal or the optical intensity. The first and second photodetectors$_{BiDi}$ 604B/654B may receive an optical signal emanating from an optical fiber of an optical fiber cable (not shown) and output data representative of the optical signal or the optical intensity thereof.

The first and second light sources$_{BiDi}$ 604A/654A may be any type of light source. For example, the first and second light sources$_{BiDi}$ 604A/654A may be a light emitting diode (LED) or a laser source. The first and second light sources$_{BiDi}$ 604A/654A emit light in order to illuminate the end face or the connector of an optical fiber or optical fiber array. Illuminating the end face or the connector enables capturing an image thereof.

The memory 610/660 may be any type of memory such as read-only memory (ROM), static random access memory (RAM) or dynamic RAM, among others. The memory 610/660 is configured to store executable instructions that, when executed by the processor 602/652, cause the processor 602/652 to perform the operations/techniques described herein. The memory 610/660 may also store data that is output by the photodetector 602/652.

The processor 602/652 receives the data representative of the optical signal or the optical intensity thereof. The processor 602/652 determines an optical loss associated with transmission of the optical signal and stores the optical loss in the memory 610/660 and/or outputs the optical loss to the port. As alternative to outputting the optical loss, the processor 602/652 may output the optical intensity for comparison with a known intensity of the optical signal as input to the optical fiber under test.

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like).

As disclosed herein, a processor or hardware processor, such as the processors 602 and 652 may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

What is claimed is:

1. An optical power self-referencing method comprising:
providing a first optical measurement device having a first photodetector$_{BiDi}$ and a first light source$_{BiDi}$ in a first bi-directional port and a first photodetector$_{PM}$ in a first power meter port;
providing a second optical measurement device having a second photodetector$_{BiDi}$ and a second light source$_{BiDi}$ in a second bi-directional port and a second photodetector$_{PM}$ in a second power meter port;
receiving factory calibration correction factors, ρ1 and ρ2, wherein ρ1 is a factory measurement error between the first photodetector$_{PM}$ and the first photodetector$_{BiDi}$ of the first optical measurement device, and wherein ρ2 is a factory measurement error between the second photodetector$_{PM}$ and the second photodetector$_{BiDi}$ of the second optical measurement device;
connecting, on the first optical measurement device, the first bi-directional port to the first power meter port using a first test cord and measuring a power level of an optical signal received at the first power meter, Px1;
connecting, on the second optical measurement device, a second bi-directional port to the second power meter port using a second test cord and measuring a power level of an optical signal received at a second power meter, Py1;
disconnecting, on the first optical measurement device, the first test cord from the first power meter port and connecting the first bi-directional port to the second power meter port using the first test cord and measuring the power level of an optical signal received at the second power meter, Px2;
disconnecting, on the second optical measurement device, the second test cord from the second power meter port and connecting the second bi-directional port to the first power meter port using the second test cord and measuring the power level of an optical signal received at the first power meter, Py2;
determining field calibration correction factors, ρ3 and ρ4, wherein ρ3 is a field measurement error between the first photodetector$_{PM}$ and the first photodetector$_{BiDi}$ of the first optical measurement device, wherein ρ4 is a field measurement error between the second photodetector$_{PM}$ and the second photodetector$_{BiDi}$ of the second optical measurement device; and wherein:

$$Px2=Px1-\rho3,$$

$$Py2=Py1-\rho4,$$

$$P_{ref1}=Py2-\rho3, \text{ and}$$

$$P_{ref2}=Px2-\rho4,$$

calculating P$_{ref1}$ and P$_{ref2}$ by substituting Px2 and Py2, wherein $$P_{ref1}=Py1-\rho4-\rho1, \text{ and}$$

$$P_{ref2}=Px1-\rho3-\rho2; \text{ and}$$

performing loss testing by disconnecting the connection end of the first test cord from the connection end of the second test cord, connecting the connection end of the first test cord and the connection end of the second test cord to opposite ends of an optical fiber link being tested, and measuring power levels of optical signals received by the first test cord, Py4, and by the second test cord, Py4, through the optical fiber link being tested;
wherein a loss at the first bi-directional port equals: Py4−P$_{ref1}$, and wherein a loss at the second bi-directional port equals: Px4−P$_{ref2}$.

2. The method of claim 1, wherein the first optical measurement device includes a first processor and a first memory, and wherein the second optical measurement device includes a second processor and a second memory.

3. The method of claim 1, wherein the first bi-directional port contains combined first photodetector$_{BiDi}$ and first light source$_{BiDi}$.

4. The method of claim 1, wherein the first power meter port contains non-contact first photodetector$_{PM}$.

5. The method of claim 1, wherein the second bi-directional port contains combined second photodetector$_{BiDi}$ and second light source$_{BiDi}$.

6. The method of claim 1, wherein the second power meter port contains non-contact second photodetector$_{PM}$.

7. The method of claim 1, further comprising: performing jumper verification by disconnecting the first test cord from the second power meter port to leave a connection end of the first test cord, disconnecting the second test cord from the first power meter port to leave a connection end of the second test cord, connecting the connection end of the first test cord to the connection end of the second test cord, and measuring power levels of optical signals received by the first test cord, Py3, and by the second test cord, Py3.

8. The method of claim 1, wherein after receiving the field calibration correction factors, ρ3 and ρ4, from a previous fiber link measurement using the first and second optical measurement devices, future optical power self-reference measurements use the previously determined ρ3 and ρ4, and do not include connecting a jumper from a bi-directional port of one optical measurement device to a power meter port of another optical measurement device.

9. The method of claim 1, wherein the method enables a single fiber bi-directional optical loss tester to perform a self-reference measurement that has an uncertainty level approximate to the uncertainty level of a 1-jumper reference measurement method.

10. An optical power self-referencing method comprising:
providing a first optical measurement device having a first photodetector$_{BiDi}$ and a first light source$_{BiDi}$ in a first bi-directional port and a first photodetector$_{PM}$ in a first power meter port;
providing a second optical measurement device having a second photodetector$_{BiDi}$ and a second light source$_{BiDi}$ in a second bi-directional port and a second photodetector$_{PM}$ in a second power meter port;
receiving factory calibration correction factors, ρ1 and ρ2, wherein ρ1 is a factory measurement error between the first photodetector$_{PM}$ and the first photodetector$_{BiDi}$ of the first optical measurement device, and wherein ρ2 is a factory measurement error between the second photodetector$_{PM}$ and the second photodetector$_{BiDi}$ of the second optical measurement device;
receiving field calibration correction factors, ρ3 and ρ4, from a previous optical fiber link measurement using the first and second optical measurement devices, wherein ρ3 is a field measurement error between the first photodetector$_{PM}$ and the first photodetector$_{BiDi}$ of the first optical measurement device, wherein ρ4 is a field measurement error between the second photodetector$_{PM}$ and the second photodetector$_{BiDi}$ of the second optical measurement device; and wherein:

$P_{ref1} = Py2 - \rho3$, and $P_{ref2} = Px2 - \rho4$, calculating $P_{ref1}$ and $P_{ref2}$ by substituting Px2 and Py2, wherein $P_{ref1} = Py1 - \rho4 - \rho1$, and $P_{ref2} = Px1 - \rho3 - \rho2$, performing jumper verification; and performing loss testing by disconnecting a connection end of a first test cord from a connection end of a second test cord, connecting the connection end of the first test cord and the connection end of the second test cord to opposite ends of an optical fiber link being tested, and measuring power levels of optical signals received by the first test cord, Py4, and by the second test cord, Py4, wherein a loss at a first bi-directional port equals: Py4−$P_{ref1}$ and wherein a loss at a second bi-directional port equals: Px4−$P_{ref2}$.

11. The method of claim 10, wherein the first optical measurement device includes a first processor, a first memory, a first bi-directional port that contains a combined first photodetector$_{BiDi}$ and first light source$_{BiDi}$, and a first power meter port that contains a non-contact first photodetector$_{PM}$, and wherein the second optical measurement device includes a second processor, a second memory, a second bi-directional port that contains a combined second photodetector$_{BiDi}$ and second light source$_{BiDi}$, and a second power meter port that contains a non-contact second photodetector$_{PM}$.

12. The method of claim 11, wherein performing jumper verification further comprises: disconnecting the first test cord from the second power meter port to leave a connection end of the first test cord, disconnecting the second test cord from the first power meter port to leave a connection end of the second test cord, and connecting the connection end of the first test cord to the connection end of the second test cord.

13. The method of claim 12, wherein performing jumper verification further comprises: measuring the power levels received at the first test cord, Py3, and at the second test cord, Py3.

14. The method of claim 10, wherein after receiving field calibration correction factors, ρ3 and ρ4, from the previous fiber link measurement using the first and second optical measurement devices, future optical power self-referencing measurements use the previously stored ρ3 and ρ4, and do not include connecting a jumper from a bi-directional port of one optical measurement device to a power meter port of another optical measurement device.

15. The method of claim 10, wherein the method implements a single fiber bi-directional optical loss tester to perform a self-reference and has an approximate uncertainty level to a 1-jumper reference method.

16. An optical power self-referencing method comprising:
providing a first optical measurement device having a first photodetector$_{BiDi}$ and a first light source$_{BiDi}$ in a first bi-directional port and a first photodetector$_{PM}$ in a first power meter port;
providing a second optical measurement device having a second photodetector$_{BiDi}$ and a second light source$_{BiDi}$ in a second bi-directional port and a second photodetector$_{PM}$ in a second power meter port;
receiving factory calibration correction factors, ρ1 and ρ2, wherein ρ1 is a factory measurement error between the first photodetector$_{PM}$ and the first photo detector$_{BiDi}$ of the first optical measurement device, and wherein ρ2 is a factory measurement error between the second photodetector$_{PM}$ and the second photodetector$_{BiDi}$ of the second optical measurement device;
receiving field calibration correction factors, ρ3 and ρ4, from a previous optical fiber link measurement using the first and second optical measurement devices, wherein ρ3 is a field measurement error between the first photodetector$_{PM}$ and the first photodetector$_{BiDi}$ of the first optical measurement device, wherein ρ4 is a field measurement error between the second photodetector$_{PM}$ and the second photodetector$_{BiDi}$ of the second optical measurement device; and wherein:

$P_{ref1} = Py2 - \rho3$, and $P_{ref2} = Px2 - \rho4$, calculating $P_{ref1}$ and $P_{ref2}$ by substituting Px2 and Py2, wherein $P_{ref1} = Py1 - \rho4 - \rho1$, and $P_{ref2} = Px1 - \rho3 - \rho2$, and performing loss testing by disconnecting a connection end of a first test cord from a connection end of a second test cord, connecting the connection end of the first test cord and the connection end of the second test cord to opposite ends of an optical fiber link being tested, and measuring power levels of optical signals received by the first test cord, Py4, and by the second test cord, Py4, wherein a loss at a first bi-directional port equals: Py4−Pref1, and wherein a loss at a second bi-directional port equals: Px4−Pref2.

17. The method of claim 16, wherein the first optical measurement device includes a first processor, a first memory, a first bi-directional port that contains a combined first photodetector$_{BiDi}$ and first light source$_{BiDi}$, and a first power meter port that contains a non-contact first photodetector$_{PM}$, and wherein the second optical measurement device includes a second processor, a second memory, a second bi-directional port that contains a combined second photodetector$_{BiDi}$ and second light source$_{BiDi}$, and a second power meter port that contains a non-contact second photodetector$_{PM}$.

18. The method of claim 17, further comprising performing jumper verification.

19. The method of claim 18, wherein performing jumper verification further comprises: disconnecting the first test cord from the second power meter port to leave a connection end of the first test cord, disconnecting the second test cord from the first power meter port to leave a connection end of the second test cord, and connecting the connection end of the first test cord to the connection end of the second test cord.

20. The method of claim 19, wherein performing jumper verification further comprises: measuring the power levels received at the first test cord, Py3, and at the second test cord, Py3.

21. The method of claim 17, wherein after receiving field calibration correction factors, ρ3 and ρ4, from the previous fiber link measurement using the first and second optical measurement devices, future optical power self-referencing measurements use the previously stored ρ3 and ρ4, and do not include connecting a jumper from a bi-directional port of one optical measurement device to a power meter port of another optical measurement device.

22. The method of claim 17, wherein the method implements a single fiber bi-directional optical loss tester to perform a self-reference and has an approximate uncertainty level to a 1-jumper reference method.

* * * * *

UNITED STATES PATENT AND TRADEMARK OFFICE
CERTIFICATE OF CORRECTION

PATENT NO. : 10,139,274 B2
APPLICATION NO. : 15/471846
DATED : November 27, 2018
INVENTOR(S) : J. David Schell It is certified that error appears in the above-identified patent and that said Letters Patent is hereby corrected as shown below:

In the Claims

Column 13, Line 54 Claim 1:
"$P_{ref1}$-$Py2$-$p3$," should read, --$P_{ref1}$-$Py2$-$p1$--

Column 13, Line 55 Claim 1:
"$P_{ref2}$-$Px2$-$p4$" should read, --$P_{ref1}$-$Py2$-$p2$--

Column 14, Line 2 Claim 1:
"test cord, $Py4$, through the optical fiber link" should read, --test cord, $Px4$, through the optical fiber link--

Column 15, Line 2 Claim 10:
"$P_{ref1}$-$Py2$-$p3$" should read, --$P_{ref1}$-$Py2$-$p1$--

Column 15, Line 3 Claim 10:
"$P_{ref2}$-$Px2$-$p4$" should read, --$P_{ref2}$-$Px2$-$p2$--

Column 15, Line 17 Claim 10:
"by the second test cord, $Py4$" should read, --by the second test cord, $Px4$--

Column 16, Line 15 Claim 16:
"$P_{ref1}$-$Py2$-$p3$" should read, --$P_{ref1}$-$Py2$-$p1$--

Column 16, Line 17 Claim 16:
"$P_{ref2}$-$Px2$-$p4$," should read, --$P_{ref2}$-$Px2$-$p$--

Column 16, Line 31 Claim 16:
"the second test cord, Py4" should read, --the second test cord $Px4$--

Signed and Sealed this
Seventh Day of May, 2019

Andrei Iancu
*Director of the United States Patent and Trademark Office*